Figure 1:
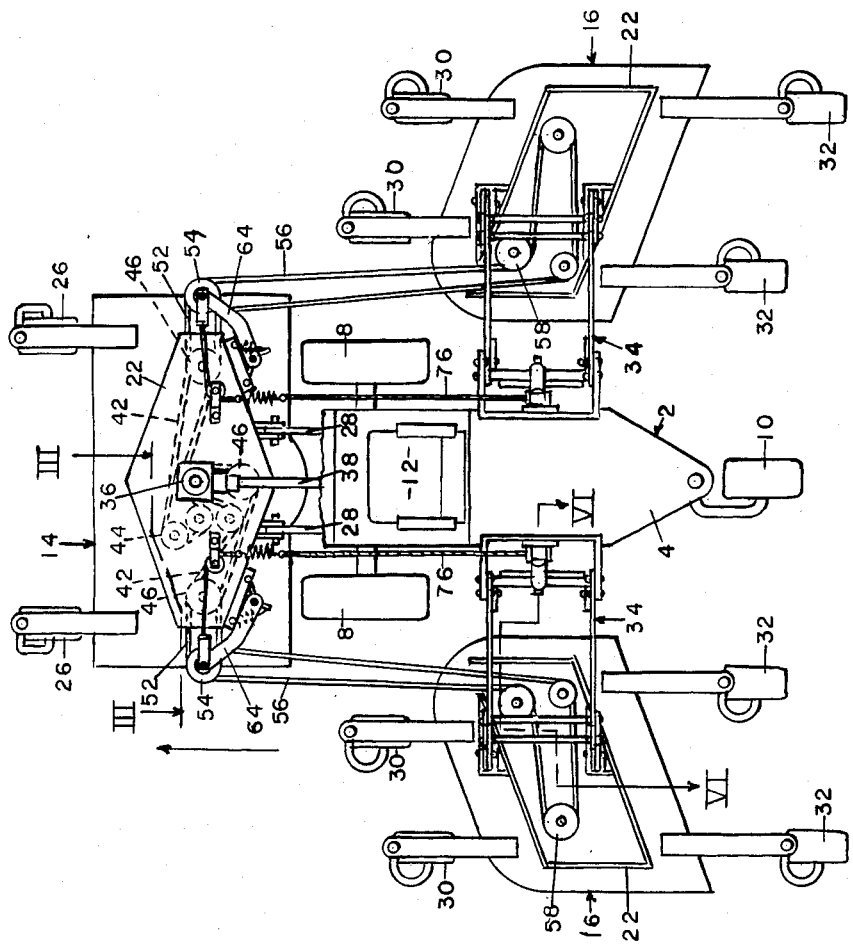

United States Patent [19]

Mullet et al.

[11] Patent Number: 4,497,160
[45] Date of Patent: Feb. 5, 1985

[54] MOWER WITH LATERAL EXTENSION WINGS

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 616,783

[22] Filed: Jun. 1, 1984

Related U.S. Application Data

[62] Division of Ser. No. 489,808, Apr. 29, 1983, abandoned.

[51] Int. Cl.³ .............. A01D 75/30; A01D 69/08; A01D 35/264
[52] U.S. Cl. .......................... 56/6; 56/11.6; 56/11.7; 56/13.6
[58] Field of Search ............ 56/11.4, 11.5, 11.6, 56/11.7, 16.22, 6, 13.6

[56] References Cited

U.S. PATENT DOCUMENTS

| | | | |
|---|---|---|---|
| 2,991,612 | 7/1961 | Holmes | 56/11.4 |
| 3,242,657 | 3/1966 | Larsan et al. | 56/11.6 |
| 3,407,579 | 10/1968 | Decker | 56/11.6 |
| 4,102,114 | 7/1978 | Estes et al. | 56/DIG. 22 |
| 4,395,865 | 8/1983 | Davis, Jr. et al. | 56/DIG. 22 |
| 4,408,683 | 10/1983 | Elmy et al. | 56/11.6 |

*Primary Examiner*—Paul J. Hirsch
*Attorney, Agent, or Firm*—John A. Hamilton

[57] ABSTRACT

A lawn mower in conjunction with a small tractor, and including a main mower deck disposed forwardly of the tractor and a pair of laterally extending wing mower decks disposed at respectively opposite sides of the tractor, all of the decks carrying mower blades, and a single power source operable to drive all of the blades of all of the decks. The wing decks may each be raised to an inoperative position closely adjacent the sides of the tractor, and in so doing the power drive to the blades of that wing is disconnected, so that the mower may be used with only the main deck in operation if so desired.

5 Claims, 9 Drawing Figures

U.S. Patent   Feb. 5, 1985   Sheet 3 of 3   4,497,160
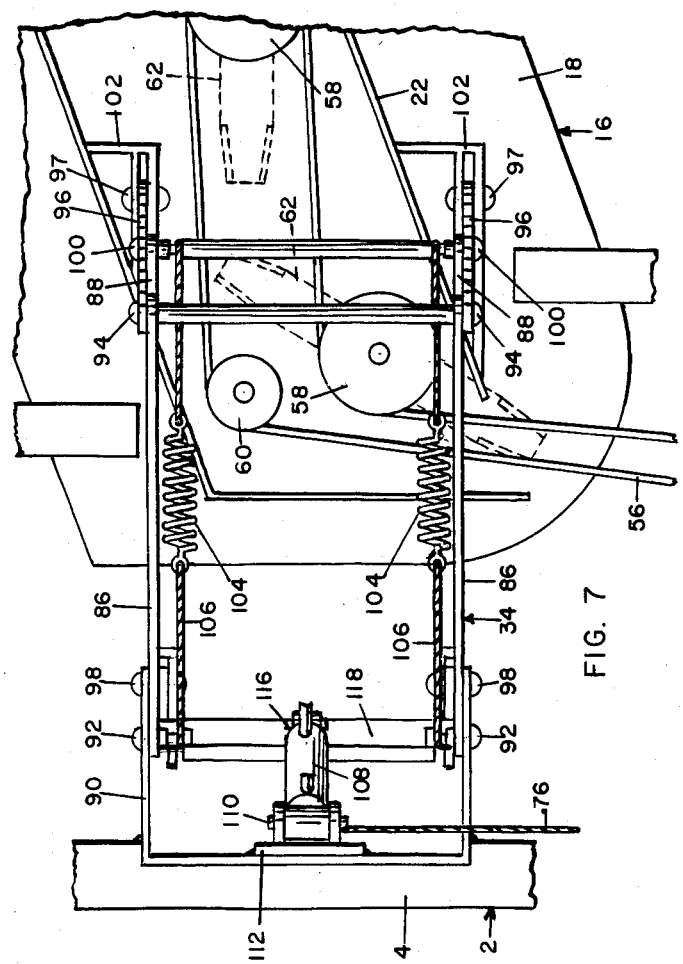
FIG. 7
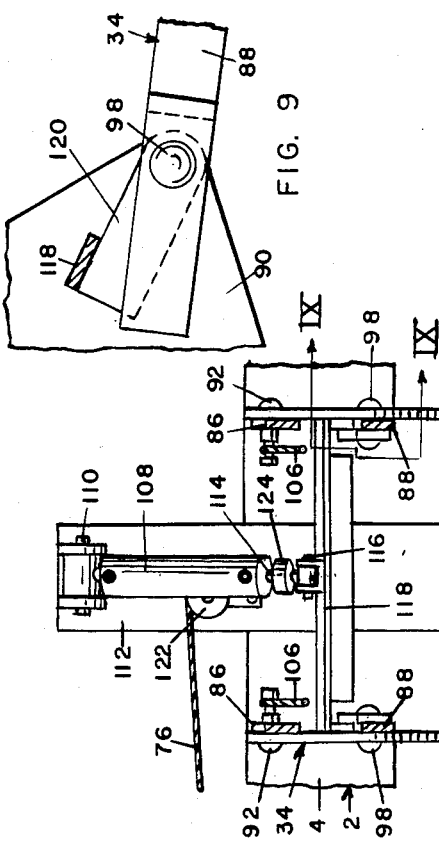
FIG. 9
FIG. 8
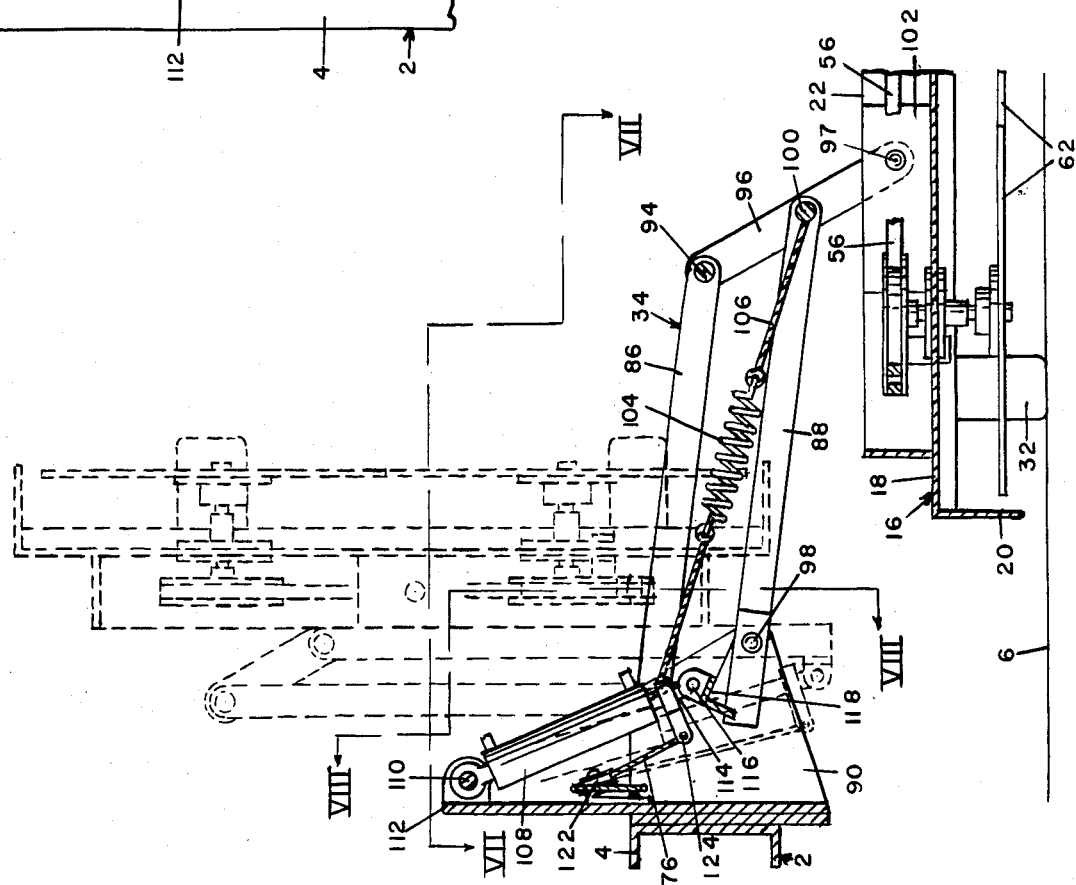
FIG. 6

MOWER WITH LATERAL EXTENSION WINGS

This is a division of application Ser. No. 06/489,808, filed Apr. 29, 1983, now abandoned.

This invention relates to new and useful improvements in lawn mowers, and has particular reference to mowers of the type mounted on and driven by small tractors of the "turf" type.

Tractor mounted and driven mowers are already available which consist of a mower deck, carrying horizontally rotary blades, disposed ahead of the tractor, being connected to and pushed by the tractor, the blades being driven by the tractor power plant. The deck blades may be multiple, in order to cut a swath somewhat wider than the tractor itself, so that the tractor itself rides only on grass which has already been cut.

The principal object of the present invention is the provision of means whereby the cutting swath of such a mower may be more than doubled, whereby to adapt the mower for economical use in very large grass areas. However, decks having lateral extension wings, also carrying blades, are known for this purpose, but they present certain problems. The main or central deck must be rather loosely supported, in order that it can follow and conform to irregular contours of the ground, and the mounting of extension wings directly thereon, which also must be free to follow irregular ground contours, creates such a compounding of the freedom of movement of the decks as to cause serious problems in the support and guidance means for the wing decks, and also in the extension of drive belts to the wings. Accordingly, the present mower utilizes lateral extension deck wings, but they are mounted directly on the tractor frame, not on the main deck, for better support and guidance thereof. Since the cutting swath of the wing decks must overlap the swath of the main deck, so as not to leave any strips of uncut grass therebetween, the wing decks are set well to the rear of the main deck, respectively at opposite sides of the tractor.

Another object is the provision of a mower of the character described in which the extension wings may be raised to non-use positions closely adjacent the sides of the tractor when the wide cutting swath provided thereby is not needed.

A further object is the provision of a mower of the character described in which the blades of both the main deck and also the extension decks are driven from a single power-driven pulley, by a novel system of belts, despite the comparatively remote relation of the main and extension decks.

A still further object is the provision of a mower of the character described in which the drive train to the blades of the extension decks is automatically interrupted whenever they are raised to their non-use positions, in order that only the blades of the main deck will operate.

Other objects are simplicity and economy of construction, and efficiency and dependability of operation.

Figure 4:
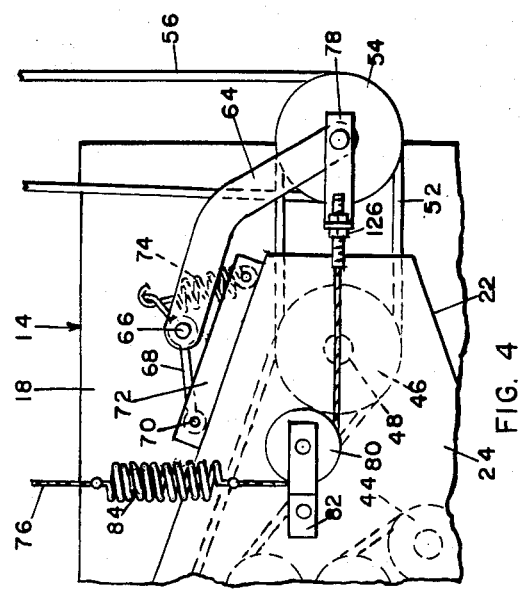
Figure 5:
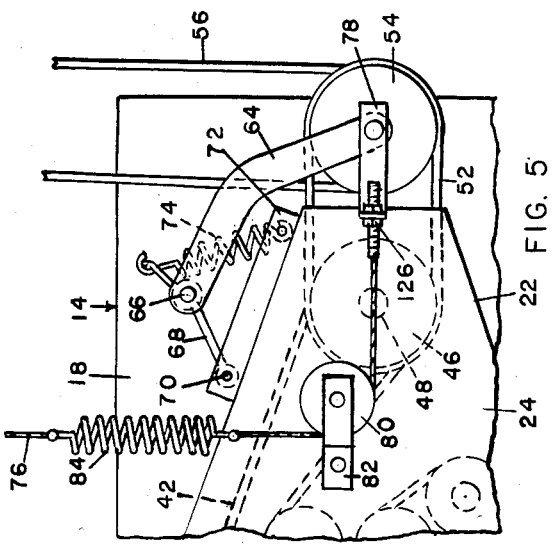
Figure 2:
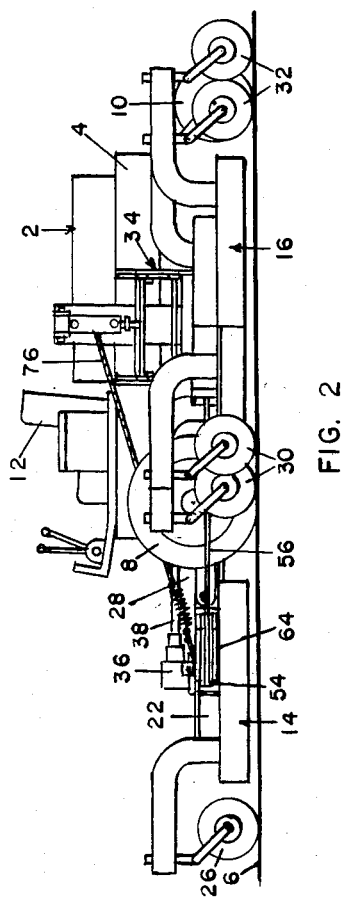
Figure 3:
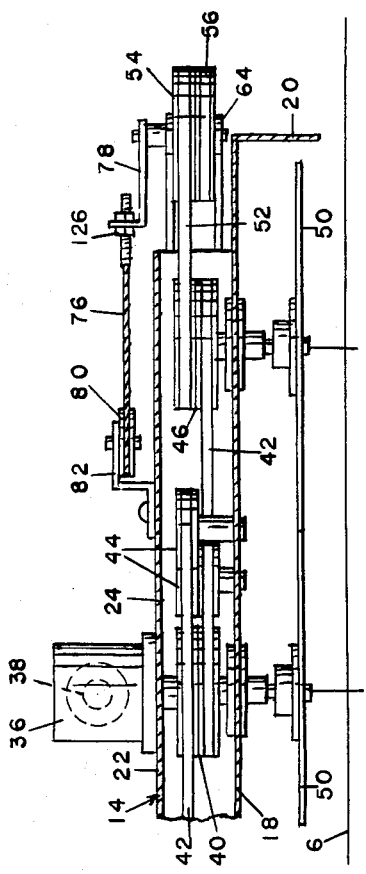

With these objects in view, as well as other objects which will appear in the course of the specification, reference will be had to the accompanying drawing, wherein:

FIG. 1 is a top plan view of a mower embodying the present invention, with parts omitted for clarity, FIG. 2 is a side elevational view of the mower as shown in FIG. 1, FIG. 3 is an enlarged, fragmentary sectional view taken on line III—III of FIG. 1, with parts left in elevation, FIG. 4 is a fragmentary top plan view of the parts shown in FIG. 3, showing the clutch in the drive train to the associated wing deck in its engaged position, FIG. 5 is a view similar to FIG. 4, but showing the clutch in its disengaged position, FIG. 6 is an enlarged, fragmentary sectional view taken on line VI—VI of FIG. 1, showing one of the extension decks in its use position in solid lines, and in its non-use position in dotted lines, FIG. 7 is a fragmentary sectional view taken on line VII—VII of FIG. 6, FIG. 8 is a fragmentary sectional view taken on line VIII—VIII of FIG. 6, and FIG. 9 is an enlarged, fragmentary sectional view taken on line IX—IX of FIG. 8.

Like reference numerals apply to similar parts throughout the several views, and the numeral 2 applies generally to a small tractor, the frame 4 of which is generally horizontal, and supported above ground level 6 adjacent its forward end by a pair of ground-engaging drive wheels 8 disposed at respectively opposite sides of frame 4, which are driven by the tractor power plant, and by a castered wheel 10 at its rearward end. The tractor driver occupies a seat 12, and controls all operations of both the tractor, and the mower to be described, from that position. Other details of the tractor structure are not considered to be pertinent to the present invention.

The mower attachments to tractor 2 consist primarily of a main mower deck 14 disposed forwardly of the tractor, and a pair of lateral extension decks 16 disposed respectively at opposite sides of the tractor, well to the rear of the main deck. Actually, while the main deck is shown forwardly of the tractor, it could also be placed to the rear of the tractor, so as to be towed thereby. The essential factors in the positioning of the main deck are that it be substantially laterally centered on the longitudinal midline of the tractor, and that its blades, to be described, be capable of cutting a swath somewhat wider than the overall width of the tractor. Each deck consists of a normally generally horizontal platform 18 having a depending skirt 20, said skirt being interrupted across the front of the deck to permit the entry of standing grass, and at the rear of the deck to permit ejection of grass cuttings. Each deck is also provided with a flat, hollow superstructure 22 above platform 18, which may be covered by a top plate 24 (shown only in connection with main deck 14). Main deck 14 is supported at its forward edge by a pair of castered ground-engaging wheels 26, and at its rearward edge by a pair of tool bars 28 mounted in and extending forwardly from tractor 2. It will be understood that the tool bars may be powered to raise or lower the main deck, but they also permit a degree of free rocking movement of the main deck in order that mower blades carried thereby may follow uneven ground contours. Each extension deck 16 is supported at its forward edge by a pair of castered wheels 30, and at its rearward edge by another pair of castered wheels 32, and each extension deck is mounted on the adjacent side of the tractor frame 4 by a laterally extending parallelogram linkage mechanism 34, best shown in FIGS. 6-9.

A gear box 36 is mounted on the top plate 24 of the superstructure 22 of main deck 14, and is driven by a drive shaft 38 powered by and extending forwardly from tractor 2. Said drive shaft may be slidably extensible and equipped with universal joints, as is common in the art, whereby also to permit limited free movement of the main deck.

Gear box 36 drives a double pulley 40 disposed within superstructure 22, which in turn functions through a system of belts 42 and idler pulleys 44 to drive three additional pulleys 46 also disposed in superstructure 22, and positioned respectively at the lateral midline of the deck, and adjacent each side of the deck. Details of the belt system are common. Each of pulleys 46 is fixed on a vertical shaft (see FIG. 3) journalled in bearings mounted on deck platform 18, and has a horizontal rotary blade 50 affixed to its lower end below said platform, but above ground level 6. The pulley 46 and its shaft 48 at the lateral midline of the deck are offset rearwardly from the side pulleys 46, so that the orbits of blades 50 may overlap laterally of the deck but do not intersect, so as to prevent any possible interference between the blades.

The pulleys 46 of the side blades are also double, and a short belt 52 trained thereabout projects laterally outwardly through the adjacent open end of superstructure 22, being trained also around a double ider pulley 54 disposed at the adjacent extreme side edge of the deck. Also trained about each idler pulley 54 is a long belt 56 which extends rearwardly to the extension deck at that side of the tractor, turning pulleys 58 (and an idler pulley 60) disposed in the superstructure 22 of that extension deck to drive a pair of blades 62 carried by that deck in the same manner as blades 50 of the main deck. The outboard blade 62 is offset rearwardly of the inboard blade, to permit lateral overlapping of their orbits without interference therebetween.

Each of idler pulleys 54 is journalled on a vertical axis in the outer end of a double toggle link 64 which extends rearwardly and laterally inwardly therefrom, being pivoted at its inner end, as at 66, to the outer end of a second toggle link 68 which extends inwardly and forwardly and is pivoted at its inner end, as at 70, to a bracket 72 affixed to the exterior of superstructure 22. Link 68 also extends outwardly from its pivot 66, and its extended end is connected to bracket 72 by a tension spring 74 which extends forwardly and laterally outwardly. It will be seen that spring 74 continuously tends to straighten the toggle links 64 and 68, thereby biasing idler pulley 54 not only forwardly, whereby to apply tension to long belt 56, but also outwardly, whereby to tension short belt 52, as shown in FIG. 4. However, idler pulley 54 may be drawn laterally inwardly, whereby to loosen belt 52 so that belt 56 is not driven, but is still maintained taut, by a cable 76 attached to the outer end of toggle arm 64 at the axis of idler pulley 54 by means of a bracket 78, then extended laterally inwardly and trained around a pulley 80 rotatably mounted in a bracket 82 at the top of the superstructure, then extended rearwardly along the adjacent side of the tractor, to be pulled by operation of the extension deck lifting mechanism, as will appear. A tension spring 84, stronger than spring 74, is interposed in each cable 76. Thus when either cable 76 is pulled rearwardly, by means to be described, spring 84 overpowers spring 74 to draw the associated idler pulley 54 inwardly, as indicated in FIG. 5, thereby buckling the toggle links 64 and 68 against the tension of spring 74, so that belt 52 is loosened and the idler pulley is no longer driven. Belt 56, however, remains taut. Thus, idler pulleys 54 and their operating means form clutch mechanisms for the blades of the extension wings.

The parallelogram mechanism 34 connecting each extension deck 16 to the tractor is best shown in FIGS. 6–9. Each of said linkages comprises a pair of upper links 86 and a pair of lower links 88, each of the upper links being pivoted at its inner end to a bracket 90 welded or otherwise affixed to the adjacent side of tractor frame 4, as at 92, and pivoted at its outer end, as at 94, to vertically extending end links 96. Similarly, lower links 88 are pivoted at their inner ends to bracket 90 at 98, and at their outer ends to end links 96 at 100. The links 86 and 88 are all parallel, and extend laterally outwardly from the tractor to form a parallelogram linkage. Outer end links 96 extend downwardly below the lower links 88, each being pivoted at its lower end to a bracket 102 forming an element of the superstructure 22 of the associated extension deck 16, as at 97. A tension spring 104 interposed in a cable 106 stretched between the upper inner and lower outer pivots 92 and 100 of the parallelogram linkage, at each side thereof, serves to assist in supporting the weight of the extension deck, and to assist in the elevation of said deck, as will appear.

The parallelogram linkage may be activated to raise the associated extension deck to a non-use position well above ground level, and in a generally vertical plane closely adjacent the side of the tractor as shown in dotted lines in FIG. 6, by a hydraulic cylinder 108 pivoted at its upper end, as at 110, to a post 112 affixed to and extending upwardly from bracket 90, between the sides of the parallelogram linkage. The piston rod 114 of said cylinder extends downwardly and outwardly, and is pivoted at its extended end, as at 116, to an intermediate point of a cross bar 118 which extends laterally between lower links 88. Said cross bar is disposed inwardly toward the tractor from link pivots 100, being pivotally supported from pivots 100 at each end thereof by short arms 120 (see FIG. 9), and is also disposed above the extreme inner ends of lower links 88, which are also extended inwardly from pivots 100. Thus, whenever either piston rod 114 is extended, it does not at first pivot the parallelogram links to raise the associated extension deck, and does not do so until cross bar 118 engages and depresses the inner ends of links 88. This "lost motion" connection of the cylinder to the linkage permits the linkage to pivot freely in a vertical direction, so that the extension deck may rise and fall as may be required for it to follow uneven ground contours. The extension deck may also tilt laterally to follow ground contours, by virtue of its pivotal mounting at 97, and may also tilt freely, to a limited extent, in a forward and rearward direction, by intentionally incorporating a degree of looseness or play in the pivots of the parallelogram linkage.

When piston rod 114 is still further extended to a slight degree after cross bar 118 engages links 88, the extension deck will be very slightly elevated above ground level, so that it no longer requires ground support. In this position, which may be termed a "suspended" use position, the deck will still hang from its pivots 97 in a generally normal horizontal plane, both because, as will be understood, the deck is generally laterally balanced relative to its pivots 97, and also because pivots 97 are disposed well above the center of gravity of the deck. This suspended use position is useful whenever there may be no adequate ground support beneath the deck in some circumstances, particularly where it may be desired to cut grass or other vegetation growing in and extending above shallow water adjacent a bank. When piston rod 114 is still further extended, the superstructure 22 of the deck is eventually engaged by lower links 88, and the deck is pivoted upwardly and inwardly to lie in a generally vertical plane closely adjacent the side of the tractor, as shown in dotted lines in FIG. 6. Retraction of piston rod 114 will of course reverse the procedure. Hydraulic cylinders 108 are powered by the hydraulic system of the tractor, under the control of the driver occupying seat 12.

The clutch cable 76 of each extension wing extends rearwardly from its associated pulley 80 on main deck 14 along the adjacent side of the tractor, is trained around a pulley 122 mounted on post 112 of the associated cylinder 108, then extended downwardly, or in the direction of piston rod extension and secured at its extreme end to a bracket 124 affixed to the piston rod 114. Thus whenever the piston rod is extended to elevate the associated extension deck, as described above, it acts through bracket 124, cable 76, and bracket 78 to move the associated idler pulley 54 to declutch the drive train to the blades of that extension deck. Otherwise, continued operation of the blades after elevation of the deck could represent a serious safety hazard. Spring 84 of cable 76 compensates for any difference between the required travel of piston rod 114 and the distance bracket 78 must be moved to accomplish the declutching. An adjustable connection 126 of each cable 76 to its clutch bracket 78 (see FIGS. 4 and 5) may be set to delay declutching sufficiently to permit use of the associated extension deck in the previously described suspended use position. In that use, the deck is still substantially horizontal, and continued operation of its blades represents no appreciable safety hazard.

Operation of the mower is deemed to have been fully described in the foregoing description of its construction. Main deck 14 may be raised and lowered from or to operative positions by means already old in the art, and not here detailed. According to the present invention, either of the extension decks 16 may also be raised or lowered from or to a use position, depending on whether the use of either is necessary or desirable in any given set of circumstances. As a safety measure, the drive train to the blades of either extension deck is interrupted whenever that deck is raised to its non-use position, and the interruption is automatic so as to require no attention or action by the operator. Despite the relatively remote location of the extension decks relative to the main deck, their blades are all driven from a single power source. The raising and lowering of the decks is accomplished with very little change in the distance between clutch idler pulleys 54 and the pulleys of the extension decks engaged by drive belts 56, and any slight variation of this distance is easily accomodated by toggle springs 74. As a further safety measure, any exposed belts, particularly the reaches of belts 56 between the main and extension decks, may be provided with tubular belt covers, not shown.

What we claim as new and desire to protect by Letters Patent is:

1. In combination with a tractor, a lawn mower comprising:
   a. a main mower deck mounted on said tractor, and having a lateral span extending outwardly beyond the sides of said tractor,
   b. a pair of lateral extension mower decks mounted on said tractor respectively at opposite sides thereof, said extension decks being offset longitudinally of the tractor relative to said main deck and extending laterally outwardly beyond the respective lateral limits of said main deck,
   c. horizontally rotatable blades carried by each of said mower decks and operable when driven to cut a swath of grass substantially as wide as the deck when the tractor is moved forwardly,
   d. a drive train powered by said tractor and operable to drive first the blades of said main mower deck, and then, through separate branches, the blades of the respective extension decks, said drive train consisting of a belt and pulley system, and
   e. a clutch interposed in each of said drive train branches, each of said clutches and its operating means comprising a double idler pulley having two belts trained thereabout, a first belt operably connecting said idler pulley to the next prior pulley in said drive train branch, and a second belt operably connecting said idler pulley to the next subsequent pulley of said drive train branch, and means operable to move said idler pulley selectively either in a first direction in which it tightens said first and second belts respectively, into driving relation thereto, or in a second direction wherein at least one of said belts is loosened to a non-driving relation thereto.

2. The combination as recited in claim 1 wherein said means for moving said idler pulley comprises:
   a. a toggle linkage connected at one end to one of said mower decks and having said idler pulley rotatably mounted at its opposite end on an axis parallel to the toggle pivots, the general extent of the loops of the first and second belts being disposed in angular relation,
   b. a toggle spring biasing said toggle linkage to a straightened condition to urge said idler pulley in a direction outwardly of the angle between said belts, and in intersecting relation to said angle, whereby both of said belts are tightened into driving relation therewith, and
   c. tension means operable when actuated to buckle said toggle linkage against the tension of said toggle spring to move said idler pulley in a direction to loosen at least one of said belts into non-driving relation therewith.

3. The combination as recited in claim 2 wherein said belts are disposed in generally right angled relation, and wherein said tension means is operable to move said idler pulley in the direction of the general extent of one of said belts, whereby said one belt, but not the other, is loosened.

4. The combination as recited in claim 2 with the addition of a pair of hydraulic cylinders each operable by extension thereof to elevate one of said extension decks to a non-use position well above ground level, and wherein the said tension means controlling the position of the idler pulley associated with each extension deck comprises a flexible cable connected at one end to said idler pulley and at its opposite end to the piston rod of the associated hydraulic cylinder, whereby extension of said cylinder to elevate said extension deck to its non-use position pulls said cable to move said idler pulley to loosen one of the belts associated therewith.

5. The combination as recited in claim 4 with the addition of a tension spring interposed in each of said cables, said cable spring being stronger than the associated toggle spring so as to be capable of overpowering the latter, and functioning to compensate for any difference between the extension of said hydraulic cylinder and the movement of said idler pulley.

* * * * *